(12) United States Patent
Tanaka

(10) Patent No.: US 7,163,199 B2
(45) Date of Patent: Jan. 16, 2007

(54) VENTILATION SYSTEM FOR FUEL CELL WATER TANK

(75) Inventor: Hiroshi Tanaka, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 213 days.

(21) Appl. No.: 10/995,347

(22) Filed: Nov. 24, 2004

(65) Prior Publication Data
US 2005/0164053 A1 Jul. 28, 2005

(30) Foreign Application Priority Data
Nov. 25, 2003 (JP) ............... 2003-393746

(51) Int. Cl.
*B01F 3/04* (2006.01)
*H01M 8/18* (2006.01)
(52) U.S. Cl. ............ 261/153; 261/30; 261/119.1; 96/202; 96/333; 429/21
(58) Field of Classification Search ......... 261/30, 261/72.1, 74, 119.1, 152, 153; 96/202, 333; 429/21, 83
See application file for complete search history.

(56) References Cited

U.S. PATENT DOCUMENTS

| 6,110,615 A * | 8/2000 | Bloomfield ............ 429/21 |
| 6,376,113 B1 * | 4/2002 | Edlund et al. ............ 429/19 |
| 2005/0053812 A1 * | 3/2005 | Hickey et al. ............ 429/21 |

FOREIGN PATENT DOCUMENTS

| JP | 2002-260708 A | 9/2002 |
| JP | 2003-282106 A | 10/2003 |

* cited by examiner

Primary Examiner—Scott Bushey
(74) Attorney, Agent, or Firm—Foley & Lardner LLP

(57) ABSTRACT

A ventilation system for a tank which stores water to be supplied to a fuel cell, which includes: a ventilator for ventilating the tank; a gas discharge line to guide gas in the tank to outside; a separator for separating moisture and/or water from the gas from the tank; a water discharge line to guide the water separated by the separator to outside; and an air supply line connected to the water discharge line, which is to supply air for vaporizing water from the water discharge line.

8 Claims, 3 Drawing Sheets

VENTILATION SYSTEM FOR FUEL CELL WATER TANK

BACKGROUND OF THE INVENTION

1. Field of the Invention

The present invention relates to a ventilation system for a water tank which stores water to be used for moisturizing and cooling a fuel cell.

2. Description of Related Art

In a vehicle-mounted fuel cell system, hydrogen gas is supplied as a fuel gas to a hydrogen electrode of a fuel cell, and air is supplied as an oxidant gas and an air electrode of the fuel cell. These gases electrochemically react with each other to generate electric power.

Japanese Patent Application Laid-Open publications No. 2003-282106 and No. 2002-260708 disclose fuel cell systems having a water circulation system for moisturizing and cooling an electrolyte membrane, a fuel electrode, and an air electrode of a fuel cell.

Some hydrogen gas present in the fuel electrode of the fuel cell enters water passages of the water circulation system by a small amount. The water circulation system is connected to a water tank which stores pure water (hereinafter, water as appropriate). The hydrogen gas in the water passage is collected together with water and accumulated in the water tank, and is to be discharged to the outside through a ventilation system. Generally, the ventilation system sends air into the water tank for diluting the accumulated hydrogen gas therein, and discharges the diluted hydrogen gas to the outside through a discharge line.

SUMMARY OF THE INVENTION

Hydrogen gas in a water tank sometimes temporarily becomes highly concentrated. To reduce the hydrogen concentration down to a permissible level in the above ventilation system, air needs to be constantly sent at a large flow rate to the water tank for diluting the hydrogen gas therein. However, when the flow rate of the air is large, the air impinges on the water surface in the tank causing splash of water, and the splash of water enters the gas discharge line. Usually, the gas discharge line includes some bends, and water that has entered the gas discharge line is easily accumulated at the bends in the line. When the piping of the gas discharge line is blocked by the accumulated water, the amount of air supplied exceeds the amount of air discharged. Accordingly, the inner pressure of the water circulation system increases, which may result in an unstable system operation. In the case that the flow rate of the air is fixed to be large for avoiding an abrupt increase of the hydrogen concentration inside the tank, the amount of water entering the gas discharge line increases, making the system operation further unstable. It is not effective to provide a relief valve or the like for releasing the inner pressure of the water tank, since it is unavoidable to discharge the highly concentrated hydrogen gas to the outside.

An increase in the inner pressure of the water circulation system imposes a load on a membrane inside the fuel cell, which may cause damage to the fuel call.

An aspect of the present invention is a ventilation system for a tank which stores water to be supplied to a fuel cell, the ventilation system comprising: a ventilator for ventilating the tank; a gas discharge line to guide gas in the tank to outside; a separator for separating moisture and/or water from the gas from the tank; a water discharge line to guide the water separated by the separator to outside; and an air supply line connected to the water discharge line, the air supply line to supply air for vaporizing water from the water discharge line.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
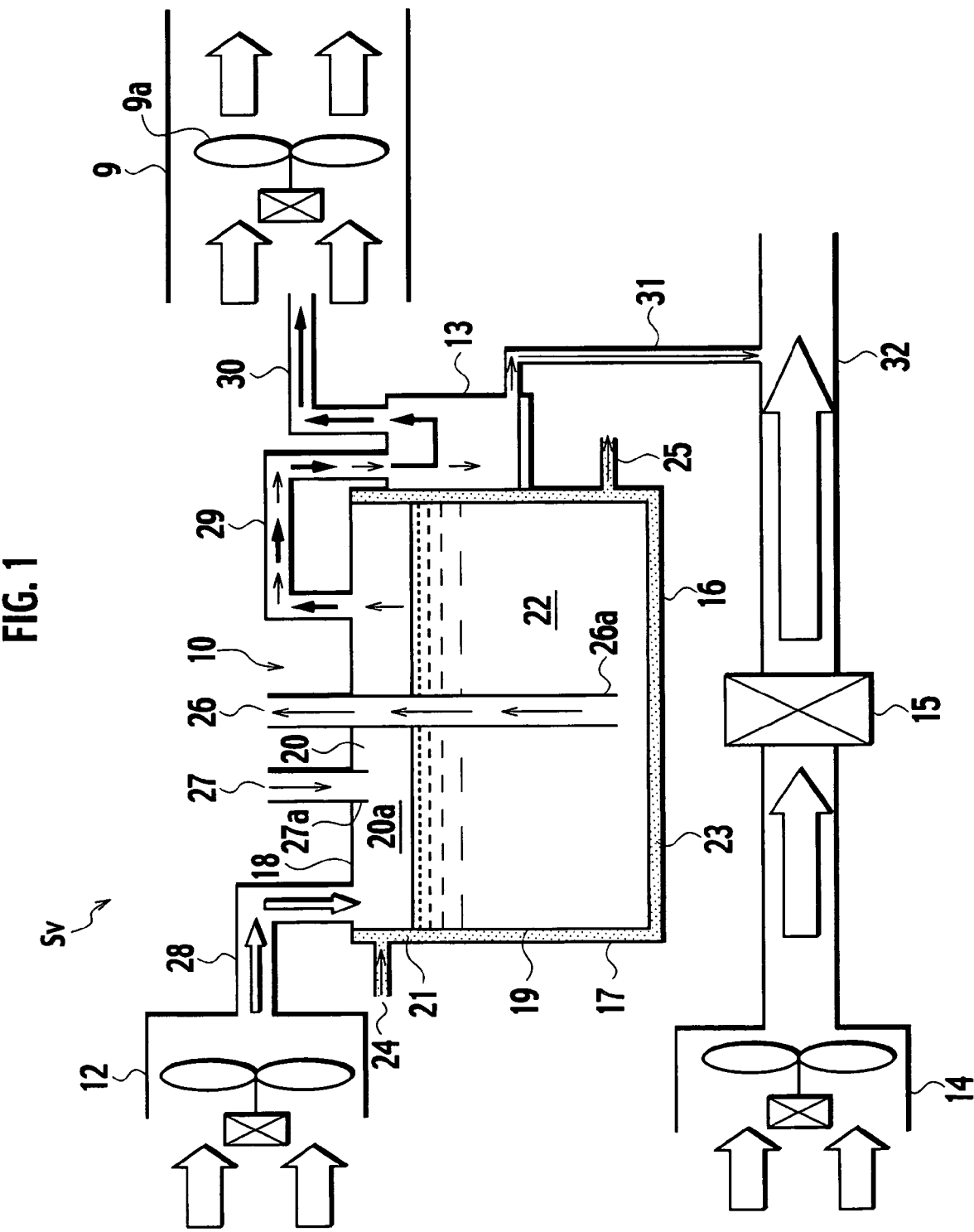
FIG. 1 is a configuration diagram showing a hydrogen ventilation system according to an embodiment of the present invention.

An embodiment of the present invention will be explained below with reference to the drawings, wherein like members are designated by like reference characters.

Figure 3:
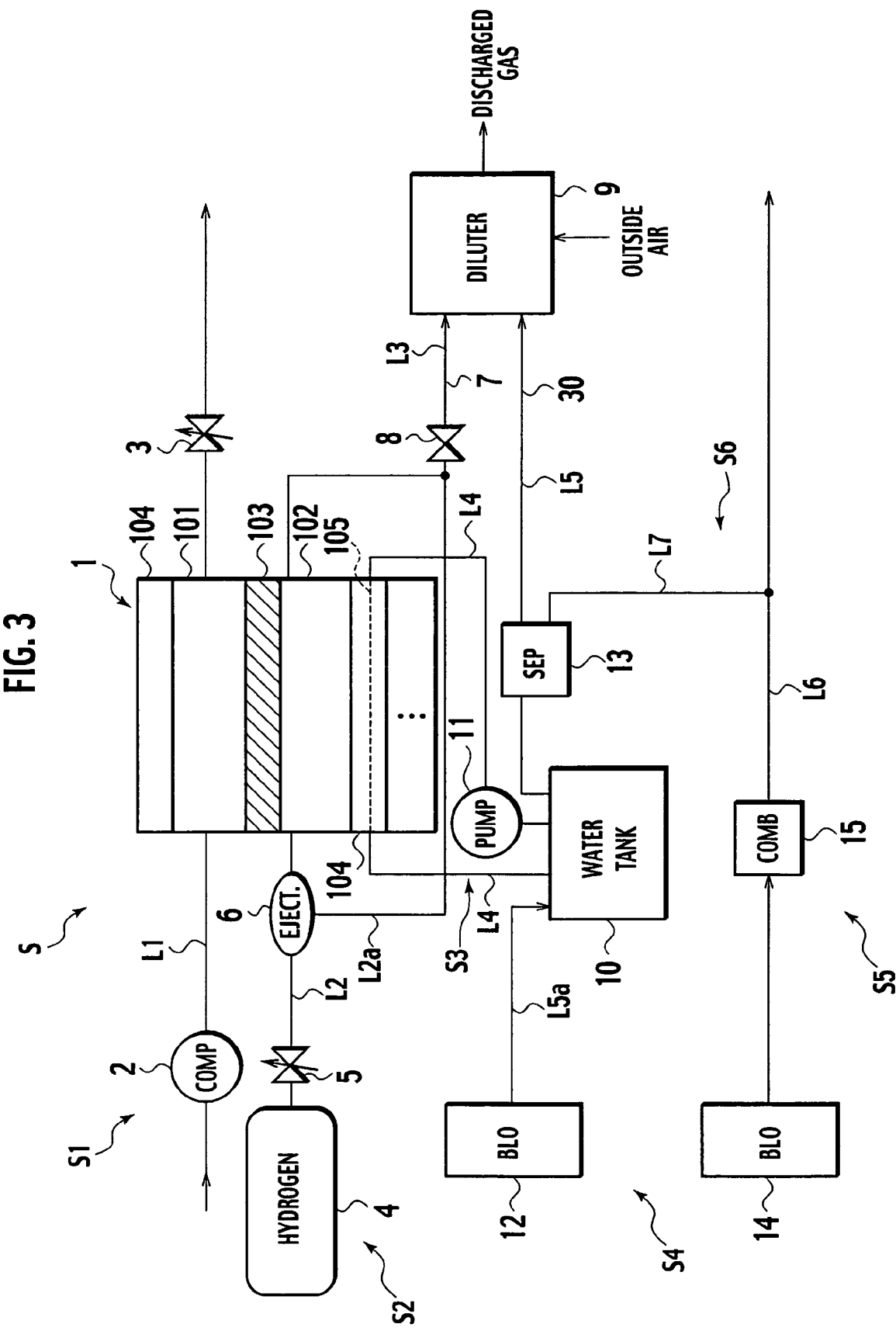
FIG. 3 is a block diagram showing a fuel cell system according to the embodiment of the present invention.

A fuel cell stack 1 generates direct current power upon supply of a fuel gas and an oxidant gas. As shown in FIG. 3, the fuel cell stack 1 includes a plurality of membrane electrode assemblies (MEA) stacked on one another with a pair of separators 104 sandwiching the MEA. Each of the MEA includes an electrolyte membrane 103, an air electrode 101 provided on one side of the electrolyte membrane 103, and a fuel electrode 102 provided on the other side thereof. The fuel cell stack 1 is provided inside thereof with a water passage 105 for moisturizing and cooling the air electrode 101, fuel electrode 102 and electrolyte membrane 103 thereof.

In this embodiment, hydrogen gas is supplied to the fuel electrodes (hydrogen electrodes) as a fuel gas, and air containing oxygen is supplied to the air electrodes as an oxidant gas for the power generation reaction in the fuel cell stack 1.

A water tank 10 stores water for moisturizing and cooling to be supplied to the fuel cell stack 1. Water is supplied from the water tank 10 to the fuel cell stack 1 through a water circulation flow path L4. Water which has not been used in the fuel cell stack 1 returns to the water tank 10 through the water circulation flow path L4 and collects in the water tank 10. Hydrogen gas which has entered the water passage 105 from the fuel electrodes 102 of the fuel cell stack 1 is transported through the water circulation flow path L4 and is accumulated in the water tank 10. The accumulated hydrogen gas is diluted inside the water tank 10, and then discharged to a hydrogen diluter 9 through a diluted hydrogen discharge flow path L5.

Gases to be introduced into the hydrogen diluter (a gas diluter) 9 are hydrogen gas which has been discharged from a hydrogen circulation flow path L2a and transported through a fuel purge flow path L3, diluted hydrogen gas which has been discharged from the water tank 10 and transported through the diluted hydrogen discharge flow path L5, and outside air. The hydrogen diluter 9 dilutes the hydrogen gas and the diluted hydrogen gas with the outside air, and then discharges the diluted gases.

A fuel cell system S shown in FIG. 3 includes: an air system S1 to supply air to the fuel cell stack 1; a fuel system S2 to supply hydrogen gas to the fuel cell stack 1; a water circulation system S3 to supply pure water for moisturizing and cooling to the fuel cell stack 1; a hydrogen dilution system S4 to dilute and discharge hydrogen gas accumulated inside the water tank 10; a gas combustion system S5 to provide a heat exchanger (not shown) with heat; and a water discharge system S6 to discharge water entered the hydrogen dilution system S4 from the water tank 10.

The air system S1 includes: a compressor 2 which is provided on an air flow path L1 upstream of the fuel cell stack 1 and sends compressed air to the fuel cell stack 1; and a control valve 3 provided on the air flow path L1 downstream of the fuel cell stack 1 for adjusting pressure of the compressed air.

The fuel system S2 includes a fuel storage tank 4, a control valve 5 provided on a fuel supply flow path L2 for adjusting pressure of the fuel gas, and an ejector 6 for circulating the fuel gas. Unused hydrogen gas discharged from the fuel electrodes 102 of the fuel cell stack 1 returns to the ejector 6 through the hydrogen circulation flow path L2a, and is supplied again to the fuel cell stack 1 through the fuel supply flow path L2. The fuel purge flow path L3 branches off from the hydrogen circulation flow path L2a. The fuel purge flow path L3 is a hydrogen discharge line 7 which branches off from the hydrogen circulation flow path L2a and is connected to the hydrogen diluter 9. A purge valve 8 is provided on the fuel purge flow path L3.

The water circulation system S3 includes the water tank 10, and a variable flow rate pump 11 capable of steplessly adjusting the flow rate of the water. The pump 11 pumps up water from the water tank 10 and supplies water to the fuel cell stack 1 through the water circulation flow path L4. Thus, the fuel cell stack 1 is moisturized and cooled.

The hydrogen dilution system S4 includes a dilution blower (an air supplier) 12, the water tank 10, a separator (a gas-liquid separator) 13, and the hydrogen diluter 9. The dilution blower 12 and the water tank 10 are connected to each other through a dilution air supply flow path L5a. The water tank 10 and the hydrogen diluter 9 are connected to each other through the diluted hydrogen discharge flow path L5 (a gas discharge line). The dilution blower 12 and the hydrogen diluter 9 constitute a ventilator of this embodiment.

In the gas combustion system S5, a combustion air blower 14 and a combustor 15 are provided on a combustion gas discharge passage (an air supply line or a combustion gas discharge line) L6.

The water discharge system S6 is a water discharge line (a drain line) L7 which branches off from the separator 13 provided on the diluted hydrogen discharge flow path L5 and connected to the combustion gas discharge flow path L6 downstream of the combustor 15.

In FIG. 3, the water tank 10, hydrogen diluter 9, dilution blower 12, separator 13, combustor 15, diluted hydrogen discharge flow path L5, water discharge line L7, and combustion gas discharge flow path L6 constitute a hydrogen ventilation system Sv of this embodiment.

FIG. 1 shows the hydrogen ventilation system Sv according to this embodiment.

The hydrogen diluter 9 includes a dilution blower 9a, inlet lines extending from the respective flow paths L3 and L5, and a casing (illustration partly omitted). To the hydrogen diluter 9, the hydrogen discharge line 7 (FIG. 3) and a diluted hydrogen discharge line 30 are connected. The hydrogen diluter 9 introduces outside air to dilute the hydrogen gas supplied through these lines, and discharges the diluted gas.

A combustion gas discharge line 32 is provided as the combustion gas discharge flow path L6 (FIG. 3) of the gas combustion system S5. The combustion gas discharge line 32 connects the combustion air blower 14 with the combustor 15. Outside air introduced by the combustion air blower 14 is sent to the combustor 15, and combustion gas generated through combustion reaction carried out inside of the combustor 15 is discharged to the heat exchanger through the combustion gas discharge line 32.

The water tank 10 is a double structure airtight water storage tank in a rectangular parallelepiped shape, which is surrounded by a bottom wall 16, four outer sidewalls 17, and a top wall 18. Inside the outer sidewalls 17, inner sidewalls 19 are provided along the outer sidewalls 17. Inside the inner sidewalls 19, there is formed a pure water container 20 with four sides thereof surrounded by the inner sidewalls 19. A heating medium chamber 21 is formed between the inner sidewalls 19 and the outer sidewalls 17. Pure water 22 is stored in the pure water container 20, and the heating medium chamber 21 is filled with a heating medium 23.

To the heating medium chamber 21 of the water tank 10, a heating medium supply line 24 and a heating medium return line 25 are connected. The heating medium 23 is heated by a heater (not shown), and supplied to the heating medium chamber 21 through the heating medium supply line 24 by a pump. Inside the heating medium chamber 21, the heating medium 23 warms up the pure water 22 stored in the pure water container 20. The heating medium 23 is then returned to the heater and the pump through the heating medium return line 25. In this way, the heating medium 23 circulates through the unillustrated heater, pump, and heating medium chamber 21. The heating medium chamber 21 and the heating medium 23 shown in FIG. 1 constitute a heating device of this embodiment. However, the heating device may be a heater using a heating wire or the like, or heat of the heat exchanger (not shown) connected to the combustor 15.

To the pure water container 20 of the water tank 10, there are connected a water supply line 26 coupled to the water circulation flow path L4, and a water return line 27. The water supply line 26 passes through the top wall 18 to extend deep inside the pure water container 20. An opening 26a at a bottom end of the water supply line 26 (an end on the pure water container 20 side) is placed in the vicinity of the bottom of the pure water container 20. The water return line 27 passes through the top wall 18 to extend into the pure water container 20. The water return line 27 protrudes downward from the top wall 18 such that an opening 27a at a bottom end of the water return line 27 (an end on the pure water container 20 side) is placed below the inner face of the top wall 18 (the pure water surface side in the pure water container 20).

An air supply line 28 is connected to the pure water container 20 of the water tank 10, to supply air sent from the dilution blower 12 into an upper space 20a in the pure water container 20. In addition, a diluted hydrogen discharge line 29 is connected to the pure water container 20 to discharge hydrogen gas diluted in the upper space 20a.

The separator 13 is mounted on the side of the water tank 10. The separator 13 separates moisture and water from the diluted hydrogen gas discharged from the pure water container 20 to the diluted hydrogen discharge line 29. In this embodiment, the separator 13 is located at a position higher than the combustion gas discharge line 32 in the gravitational force direction.

Figure 2:
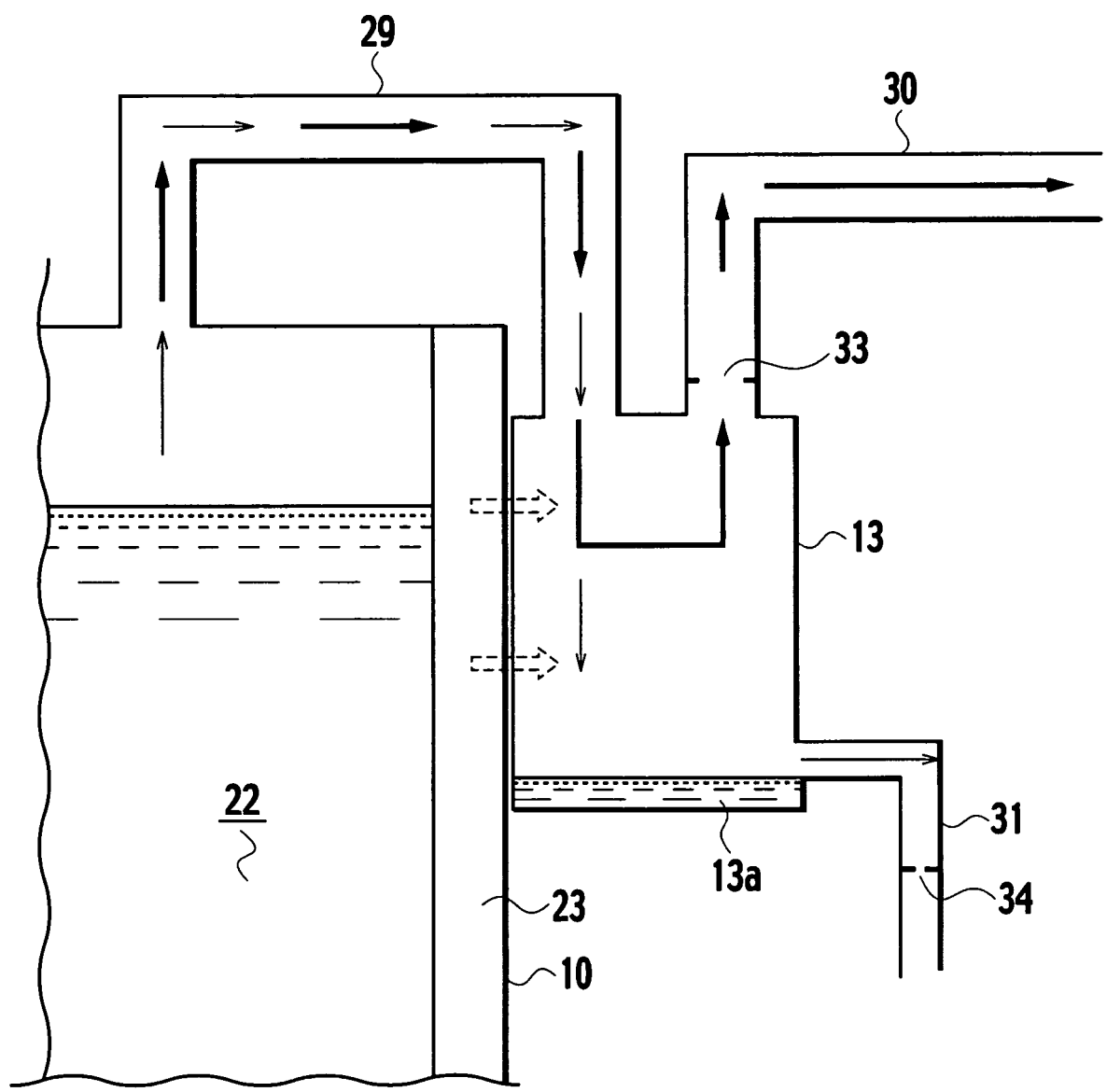
FIG. 2 is a configuration diagram showing a separator and peripheral devices thereof according to the embodiment of the present invention.

As shown in FIG. 2, the separator 13 is attached to the side of the water tank 10 so that the heat of the heating medium 23 circulating in the heating medium chamber 21 is transferred to the separator 13 (shown by the broken-line arrows). The separator 13 may be attached directly to the side face of the water tank 10, or indirectly with a heat conducting member or the like sandwiched therebetween.

the diluted hydrogen discharge line 29 and the diluted hydrogen discharge line 30 is connected to the top of the separator 13. The diluted hydrogen discharge line 29 is to introduce the moisture-containing diluted hydrogen gas discharged from the water tank 10 into the separator 13. The diluted hydrogen discharge line 30 is to discharge the diluted hydrogen gas, from which the moisture has been separated by the separator 13, to the hydrogen diluter 9 on the next stage. A drain line 31 is connected to a lower portion of the separator 13, to discharge the moisture or water which has entered the diluted hydrogen discharge line 29 and is separated from the diluted hydrogen gas. The drain line 31 is connected to the combustion gas discharge line 32 (FIG. 1). In this embodiment, the drain line 31 is extended from the separator 13 and connected to the combustion gas discharge line 32 downstream of the combustor 15.

In this embodiment, an example is shown in which the drain line 31 is connected to the combustion gas discharge line 32. However, an air supply line to supply air for vaporizing and diluting water drained from the drain line 31 may be provided as a different system line, and the drain line 31 may be connected to this line.

In the diluted hydrogen discharge line 30, an orifice 33 is provided. In the drain line 31, an orifice 34 is provided. The orifice 33 controls the amount of diluted hydrogen gas to be discharged from the separator 13. The orifice 34 controls the amount of water (or diluted hydrogen gas) to be discharged from the separator 13. The flow rate of diluted hydrogen gas to be discharged from the diluted hydrogen discharge line 30 and that of water (or diluted hydrogen gas) to be discharged from the drain line 31 can be adjusted by appropriately selecting inner diameters of the orifices 33 and 34. The orifice 33 or 34 may be other choking device such as a throttle.

In this embodiment, a cross sectional area (or an inner diameter in the case that the lines are pipings formed of circular tubes) of the diluted hydrogen discharge line 30 is selected so as to be larger than that of the drain line 31.

In FIG. 2, the moisture-containing diluted hydrogen gas accumulated in the water tank 10, and the spray of water from the surface of water inside the water container 20, are introduced into the separator 13 through the diluted hydrogen discharge line 29. After the moisture and the water have been separated from the diluted hydrogen gas in the separator 13, the diluted hydrogen gas is discharged through the diluted hydrogen discharge line 30 to the hydrogen diluter 9. The separated moisture and water are accumulated at a bottom portion 13a of the separator 13, and some of the accumulated moisture and water is drained to the combustion gas discharge line 32 through the drain line 31. It is not only the separated water that flows into the drain line 31, but also diluted hydrogen gas is discharged through the drain line 31 when such water is not flowing therein.

Next, a description will be given of a ventilation of the water tank 10 in the ventilation system.

In the fuel cell system S shown in FIG. 3, the hydrogen gas in the fuel electrodes 102 of the fuel cell stack 1 enters the water passage 105 through the separator(s) 104, and is transported through the water circulation flow path L4 and accumulated in the water tank 10. As shown in FIG. 1, air is supplied from the dilution blower 12 to the water tank 10 through the air supply line 28. The hydrogen gas accumulated in the upper space 20a in the water tank 10 is diluted with the air supplied from the dilution blower 12, to be discharged as the diluted hydrogen gas. The diluted hydrogen gas and spray of water splashed out from the surface of the water are introduced into the separator 13 through the diluted hydrogen discharge line 29. In the separator 13, moisture contained in the diluted hydrogen gas and water that has flowed out from the water tank 10 are separated from the diluted hydrogen gas. After the separation, the diluted hydrogen gas is sent to the hydrogen diluter 9 through the diluted hydrogen gas discharge line 30. The separated moisture or water is discharged from the lower portion of the separator 13 through the drain line 31 to the combustion gas discharge line 32. The diluted hydrogen gas discharged to the hydrogen diluter 9 is further diluted in the hydrogen diluter 9 with outside air introduced therein, and then discharged to the outside. The water drained through the drain line 31 is vaporized and diluted in the combustion gas discharge line 32 with a combustion gas supplied from the combustor 15.

According to the above ventilation system Sv, moisture contained in diluted hydrogen gas discharged from the water tank 10 to the diluted hydrogen gas discharge line 29, and water which has splashed out from the surface of the water in the water tank 10 and entered the diluted hydrogen discharge line 29 are separated from the diluted hydrogen gas by the separator 13. Thus, water is not accumulated at the orifice 33 or a bend in the diluted hydrogen discharge line 30 downstream of the separator 13, and hence the line is not blocked by water. Accordingly, a outlet pressure of the blower 12 is not applied on the surface of the water in the water tank 10, and a pressure in the water circulation system S3 does not increase. Thus, the system can be operated stably, and the membranes 103 inside the fuel cell stack 1 are free from unwelcome pressure loading, whereby damage to the stack can be prevented.

In this embodiment, the hydrogen diluter 9 is provided downstream of the separator 13. Thus, even when highly concentrated diluted hydrogen gas is flowed out from the water tank 10 temporarily, the gas can be sufficiently diluted before being discharged. In this way, discharge of highly concentrated hydrogen gas to the outside can be prevented. In addition, it is not necessary to constantly supply a large amount of air to the water tank 10 to be prepared for a sudden flow-in of highly concentrated hydrogen gas. In other words, it is possible to dilute hydrogen gas inside the water tank 10 with a small amount of air. Moreover, since the dilution air is supplied at a low flow rate to the water tank 10, water does not splash out from the surface of water in the water tank 10, and whereby the amount of water to enter the gas discharge line L5 is reduced.

Water separated from the hydrogen gas is discharged to the combustion gas discharge line 32, where the water is vaporized and diluted with the combustion gas sent from the combustor 15. When there is no water to flow into the drain line 31, the diluted hydrogen gas passes through the S separator 13 and flows into the drain line 31. Since the drain line 31 is connected to the combustion gas discharge line 32, even when highly concentrated hydrogen gas temporarily enters the drain line 31, the hydrogen gas is sufficiently diluted with the combustion gas sent from the combustor 15.

Water accumulated in the separator 13 flows into the drain line 31 when the amount of the accumulated water exceeds the holding capacity of the separator 13, when the accumulated water is blown by the diluted hydrogen gas flowing through the separator 13, when the separator 13 is shaken, or the like. In this embodiment, the separator 13 is placed at a position higher than the combustion gas discharge line 32 in the gravitational force direction. Therefore, even when an operation of the system is stopped with water in the separator 13 flowing into the drain line 31, the water in the drain line 31 flows to the combustion gas discharge line 32 by its own weight to clear the drain line 31. Accordingly, the drain line 31 is not blocked by frozen water even when the line is left with water therein under a low temperature condition.

Water discharged from the separator 13 is sent to the combustion gas discharge line 32 through the drain line 31. Hence, it is not necessary to provide an exclusive air supply line for vaporizing and diluting water discharged from the drain line 31, thus simplifying the system.

Further, the drain line 31 is connected to the combustion gas discharge line 32 downstream of the combustor 15. Therefore, it is possible to perform stable combustion without lowering the combustion temperature in the combustor 15, as compared with the case where the drain line 31 is connected to the combustion gas discharge line 32 upstream of the combustor.

The diluted hydrogen discharge line 30 from the separator 13 is selected to be larger in cross sectional area than the drain line 31. Thus, the diluted hydrogen gas is discharged more from the diluted hydrogen discharge line 30.

Moreover, the separator 13 is coupled to the side face of the water tank 10 so that heat of the heating medium chamber 21 is transferred to the separator 13. Therefore, even when water droplets remains at the orifice 33 and/or the bends in the diluted hydrogen discharge line 30 and are frozen, the frozen water can be melted by the heat from the heating medium chamber 21. Thus, since the gas discharge line is not blocked by frozen water even under a low temperature, the inner pressure of the water circulation system S3 is not increased. Accordingly, it is possible to secure a stable system operation, and to prevent the stack from being damaged.

The preferred embodiments described herein are illustrative and not restrictive, and the invention may be practiced or embodied in other ways without departing from the spirit or essential character thereof. The scope of the invention being indicated by the claims, and all variations within come within the meaning of claims are intended to be embraced herein.

The present disclosure relates to subject matters contained in Japanese Patent Application No. 2003-393746, filed on Nov. 25, 2003, the disclosure of which is expressly incorporated herein by reference in its entirety.

What is claimed is:

1. A ventilation system for a tank which stores water to be supplied to a fuel cell, the ventilation system comprising:
   a ventilator for ventilating the tank;
   a gas discharge line to guide gas in the tank to outside;
   a separator for separating moisture and/or water from the gas from the tank;
   a water discharge line to guide the water separated by the separator to outside; and
   an air supply line connected to the water discharge line, the air supply line to supply air for vaporizing water from the water discharge line.

2. The ventilation system according to claim 1, wherein the separator is set in a position higher than the air supply line.

3. The ventilation system according to claim 1, wherein the air supply line comprises a combustion gas discharge line provided with a combustor.

4. The ventilation system according to claim 3, wherein the water discharge line is connected to the combustion gas discharge line downstream of the combustor.

5. The ventilation system according to claim 1, wherein the ventilator comprises an air supplier for supplying air to the tank, and a gas diluter provided on an end of the gas discharge line, for diluting gas from the separator with air.

6. The ventilation system according to claim 1, wherein the gas discharge line downstream the separator is larger in its cross sectional area than the water discharge line.

7. The ventilation system according to claim 1, wherein either the gas discharge line or the water discharge line is provided downstream the separator with an orifice.

8. The ventilation system according to claim 1, wherein the tank is provided with a heating device on which the separator is mounted so that heat transfers from the heating device to the separator.

* * * * *